United States Patent
Li et al.

(10) Patent No.: US 7,724,439 B2
(45) Date of Patent: May 25, 2010

(54) LENS, A LENS ARRAY AND IMAGING DEVICE AND SYSTEM HAVING A LENS, AND METHOD OF FORMING THE SAME

(75) Inventors: Jin Li, Meridian, ID (US); Jiutao Li, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 11/976,404

(22) Filed: Oct. 24, 2007

(65) Prior Publication Data

US 2009/0109542 A1 Apr. 30, 2009

(51) Int. Cl.
*G02B 27/10* (2006.01)
*G02B 3/00* (2006.01)

(52) U.S. Cl. .................. 359/626; 359/652; 359/654; 359/565; 359/743; 359/619; 264/255; 264/1.7; 264/2.1; 385/124

(58) Field of Classification Search ................. 359/455, 359/565, 566, 569, 570, 619, 625, 626, 652, 359/654, 667, 741–743, 288; 264/1.7, 1.8, 264/1.32, 2.1, 2.4, 2.7, 255; 343/910, 911 L; 351/161, 162, 169, 177; 385/124; 257/98, 257/432, 436; 348/340
See application file for complete search history.

(56) References Cited

U.S. PATENT DOCUMENTS

| | | | |
|---|---|---|---|
| 2,216,965 A | 10/1940 | Sukumlyn | |
| 2,849,713 A * | 8/1958 | Robinson Jr. | ................ 343/910 |
| 3,447,860 A * | 6/1969 | Lucas | ........................ 359/743 |
| 3,718,383 A * | 2/1973 | Moore | ........................ 359/654 |
| 3,816,160 A * | 6/1974 | Moore | ........................ 427/164 |
| 3,823,995 A * | 7/1974 | Carpenter | ................... 385/124 |
| 4,761,062 A * | 8/1988 | Loce et al. | .................. 359/654 |
| 4,848,881 A * | 7/1989 | Kahan et al. | ................. 359/288 |
| 4,906,246 A * | 3/1990 | Grendahl | .................... 623/6.28 |
| 4,956,000 A | 9/1990 | Reeber et al. | |
| 5,102,694 A | 4/1992 | Taylor et al. | |
| 5,262,896 A * | 11/1993 | Blankenbecler | ............. 359/653 |
| 5,486,951 A * | 1/1996 | Hamblen | ..................... 359/565 |
| 5,629,800 A * | 5/1997 | Hamblen | ..................... 359/565 |
| 5,673,353 A * | 9/1997 | Ward et al. | ................... 385/124 |
| 5,711,890 A | 1/1998 | Hawkins et al. | |
| 5,734,190 A | 3/1998 | Hawkins et al. | |
| 5,824,236 A | 10/1998 | Hawkins et al. | |
| 6,027,672 A | 2/2000 | Weitzel et al. | |
| 6,211,916 B1 | 4/2001 | Hawkins et al. | |
| 6,639,727 B2 * | 10/2003 | Kusuyama | ................. 359/619 |
| 6,661,581 B1 | 12/2003 | Sankur | |
| 6,712,466 B2 * | 3/2004 | Dreher | ....................... 351/161 |
| 6,788,472 B1 | 9/2004 | Iwasaki | |
| 6,821,810 B1 | 11/2004 | Hsiao et al. | |
| 6,833,601 B2 | 12/2004 | Murakami | |
| 6,903,395 B2 | 6/2005 | Nakai et al. | |
| 6,953,925 B2 | 10/2005 | Fang et al. | |
| 7,002,754 B2 * | 2/2006 | Baer et al. | .................. 359/653 |
| 7,097,778 B2 | 8/2006 | Ho et al. | |

(Continued)

*Primary Examiner*—Loha Ben
(74) *Attorney, Agent, or Firm*—Dickstein Shapiro LLP

(57) ABSTRACT

A lens, a lens array and imaging device and system containing a lens, and a method of forming a lens array and an imaging device and system containing a lens. Each lens has varying reflection indices in a radial direction.

23 Claims, 7 Drawing Sheets

U.S. PATENT DOCUMENTS

| | | |
|---|---|---|
| 7,110,649 B2 * | 9/2006 | Hisatomi et al. ............ 385/125 |
| 7,119,319 B2 | 10/2006 | Noto et al. |
| 7,476,833 B2 * | 1/2009 | Inaba ...................... 250/208.1 |
| 2004/0232105 A1 | 11/2004 | Kaise et al. |
| 2005/0103745 A1 | 5/2005 | Li |
| 2005/0133478 A1 | 6/2005 | Kim et al. |
| 2007/0035849 A1 | 2/2007 | Li et al. |
| 2007/0148805 A1 | 6/2007 | Kim |
| 2007/0217020 A1 | 9/2007 | Li et al. |

* cited by examiner

LENS, A LENS ARRAY AND IMAGING DEVICE AND SYSTEM HAVING A LENS, AND METHOD OF FORMING THE SAME

FIELD OF THE INVENTION

Embodiments described herein relate generally to a lens, a lens array and imaging device and system containing a lens, and a method of forming the same.

BACKGROUND OF THE INVENTION

Lenses have been used to collect incident light from a larger light area and focus the collected light onto a smaller area. For example, in the application of an imaging device, microlenses are used to focus incident light impinged on the imaging device onto a photosensitive area of a corresponding photosensor, thereby improving photosensitivity of the imaging device. In an image display device, on the other hand, lenses can be used to transmit light from a light-producing component to project an image for display. Products and systems that utilize lenses and microlenses in these and other similar ways include, without limitation, flat-panel visual displays, solar panels, digital cameras, camera mobile telephones, video telephones, computer input devices, scanners, machine vision systems, vehicle navigation systems, surveillance systems, auto focus systems, star trackers, motion detector systems, and image stabilization systems among other imager and display applications.

Lenses can be formed through an additive process. In a conventional additive microlens fabrication, one or more lens materials are deposited onto a substrate and formed into a microlens array using a reflow process. For example, a lens material is patterned into individual lens units with gaps around each lens unit. During reflow of the patterned lens material, the individual lens units undergo a heating process and transform into a partially spherical shape driven by the force equilibrium of surface tension and gravity. The individual lens materials then harden in this shape to form microlenses.

A number of conventional lens fabrication techniques may affect focal characteristics of the resultant lenses in the same lens array. For example, when the various microlenses in the same microlens array have different curvatures, the microlenses may have different focal characteristics, which may compromise the quality of images captured by the imaging device. Also, heat, ultra-violet treatment and/or type of photoresist materials used during an additive process may affect stability of the lens materials and/or optical properties of the resulting lenses.

It is desirable to provide an improved method of fabrication and structure for a lens, lens array, and imaging device and system having a lens that mitigates these problems.

DETAILED DESCRIPTION OF THE INVENTION

Figure 1A:
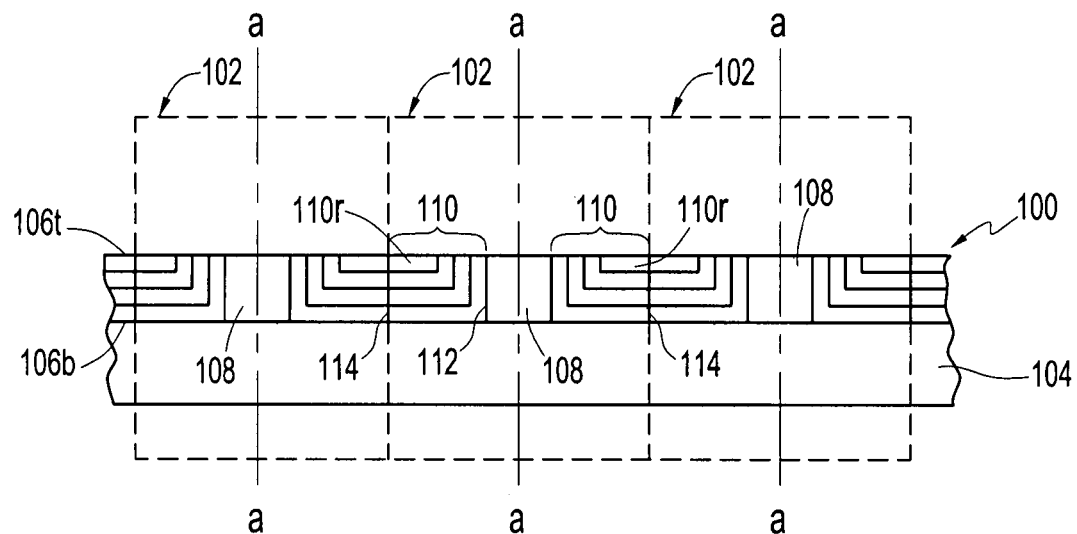
FIG. 1A is a partial cross-sectional view of a lens array containing lenses formed according to an embodiment disclosed herein.

In the following detailed description, reference is made to the accompanying drawings, which form a part hereof and show by way of illustration specific embodiments and examples in which the claimed invention may be practiced. These embodiments and examples are described in sufficient detail to enable one skilled in the art to practice them. It is to be understood that other embodiments and examples may be utilized, and that structural, logical, and electrical changes and variations may be made. Moreover, the progression of processing steps is described as an example; the sequence of steps is not limited to that set forth herein and may be changed, with the exception of steps necessarily occurring in a certain order.

The term "substrate" used herein may be any supporting structure including, but not limited to, a semiconductor substrate having a surface on which devices can be fabricated. A semiconductor substrate should be understood to include silicon, silicon-on-insulator (SOI), silicon-on-sapphire (SOS), doped and undoped semiconductors, epitaxial layers of silicon supported by a base semiconductor foundation, and other semiconductor structures, including those made of semiconductors other than silicon. When reference is made to a semiconductor substrate in the following description, previous process steps may have been utilized to form regions or junctions in or over the base semiconductor or foundation.

The term "pixel" or "pixel cell" as used herein refers to a photo-element unit cell for either capturing or emitting light. For example, a pixel can contain at least a photosensor for converting photons to an electrical signal as may be employed by an imaging device. The pixel cells described herein can be CMOS four-transistor (4-T) pixel cells, or CMOS pixel cells that have more or less than four transistors. In addition, the embodiments disclosed herein may be employed in other types of solid state imaging devices other than CMOS imaging devices, e.g., CCD devices and others, where a different pixel and readout architecture may be used. Alternatively, a pixel can contain at least one photo emitting element for producing light as may be employed in an image display device.

The term "lens" as used herein refers to a transparent structure that can change light paths from a generally larger field to a generally smaller field or vice versa. For example, the lenses can include microlenses for focusing incident light onto corresponding photosensors, as may be used in various solid state imaging devices including CMOS imaging devices and charge coupled devices (CCDs) and other imaging devices. Alternatively, the lenses can be used to transmit light from a light-producing component to project an image for display.

Various embodiments are now described with reference to the drawing figures, in which similar components and elements are designated with the same reference numeral and redundant description is omitted. Although certain embodiments below are described in relation to use with a CMOS imaging device, as noted, such embodiments are not so limited and have applicability to other solid state imaging and display devices.

Figure 1B:
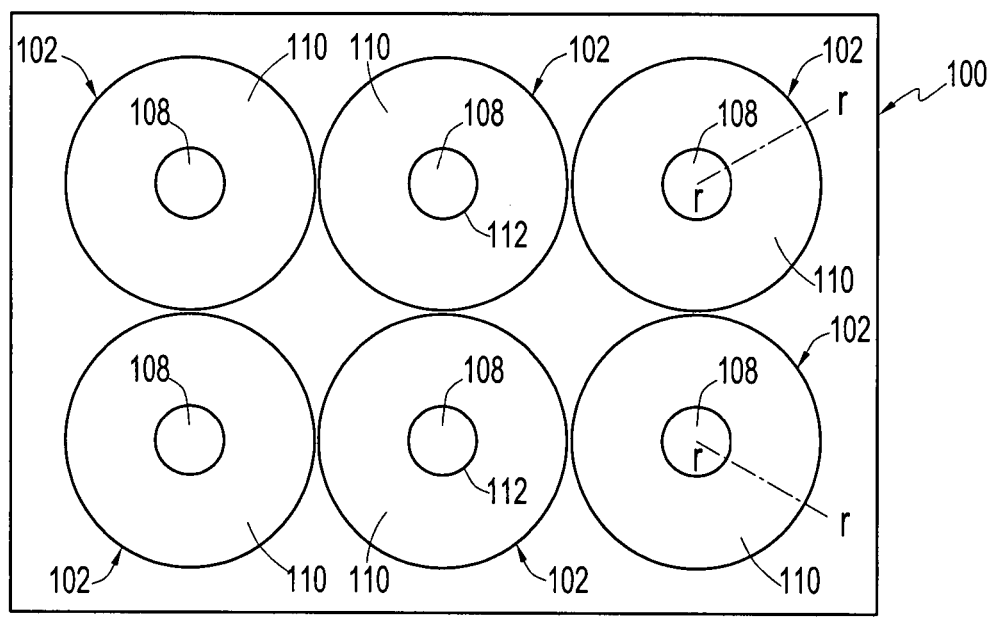
FIG. 1B is a partial top-down view of a lens array containing lenses formed similarly to those shown in FIG. 1A.

FIGS. 1A and 1B each illustrate a lens array 100 containing a plurality of lenses 102 formed in accordance with an embodiment disclosed herein. The lenses 102 can be formed over or supported by a supporting structure 104, which can be a substrate as described above or a dielectric layer described below. The lens array 100 can be formed as a microlens array 100' (see FIG. 3), in which the lenses 102 are each designed to focus light onto a respective photosensor positioned below the corresponding lens 102. Alternatively, the lenses 102 in the lens array 100 can transmit light from a respective light emitting device positioned below the corresponding lens 102. Because the various lenses 102 in the array 100 are similarly formed, only one such lens 102 will be described in greater detail below.

In the embodiment shown in FIG. 1A, each lens 102 is substantially defined by a base surface 106b and a top surface 106t. In one example where the lens array 100 is in the form of a microlens array 100' used in an imaging device 300 (see FIG. 3), incident light impinges on the top surface 106t, passes through the lens 102, and exits from the base surface 106b of the lens 102. Each lens 102 can have an axial direction a-a substantially transverse to the base surface 106b of the lens 102. At least a portion of the top surface 106t is spaced apart from the base surface 106b in the axial direction a-a. The top surface 106t can be in any of various shapes including a convex or concave shape, either curved (not shown) or planar. In the embodiment shown in FIG. 1A, the top surface 106t is substantially planar and parallel to the base surface 106b of the lens 102. In one example, the top surface 106t is a planarized surface, over which additional components can be immediately formed without the need of an additional planarized layer.

Each lens 102 is formed to comprise a first lens portion 108 and one or more second lens portions 110. The first lens portion 108 can be formed near a center portion of the lens 102 and at least partially surrounded by the second lens portions 110. In the alternative, the first lens portion 108 can be positioned away from the center portion of the lens 102 (i.e., off-centered).

As is shown in FIGS. 1A and 1B, each first lens portion 108 can have a sidewall 112 extending substantially in the axial direction a-a of the lens 102 from the base surface 106b toward the top surface 106t of the lens 102 so that the first lens portion 108 forms a portion of the base surface 106b. Additionally or alternatively, the sidewall 112 can extend to the top surface 106t of the lens 102 so that the first lens portion 108 forms a portion of the top surface 106b, as is shown in FIG. 1A.

The first lens portion 108 can have any of various cross-sectional shapes viewed from a top-down view of the lens array 100. For example, the first lens portion 108 can have a substantially circular cross-section, as is shown in FIG. 1B, or a square or other shaped cross-section. As FIG. 1B shows, the various first lens portions 108, as well as the resultant lenses 102 of the lens array 100, can be arranged in rows and columns, so that each first lens portion 108 and the corresponding lens 102 can be aligned with a pixel cell 322 in a pixel array 320, as shown in greater detail in FIG. 3.

One or more second lens portions 110 can be provided to form the remainder of each lens 102. Each of the second lens portions 110 can be formed to extend to the top surface 106t of the lens 102 and define a portion of the top surface 106t of the lens 102. In the example shown in FIG. 1A, four second lens portions 110 are positioned between the sidewall 112 of the first lens section 108 and the edge 114 of the lens 102. Some of the second lens portions 110 can have substantially the same thickness in the radial direction r-r. In the example shown in FIG. 1A, the outermost second lens portion 110r has an increased thickness in the radial direction r-r comparing to the rest of the second lens portions 110. The various second lens portions 110 can be stacked together, or overlap one another, in a radial direction r-r (see, FIG. 1B) of the lens 102. For example, the second lens portions 110 can be formed to be concentric with one another.

In each lens 102, the second lens portions 110 can be formed to surround at least a portion of the sidewall 112 of the first lens portion 108. For example, the stacked or overlapped second lens portions 110 can be shaped to partially conform to the shape of the sidewall 112 and can be positioned in contact with the sidewall 112 of the first lens portion 108. Alternatively, the second lens portions 110 can be formed to surround substantially the entire sidewall 112 of the first lens portion 108 and enclose the first lens portion 108 therein. In such a case, the first lens portion 108 can be in the form of a core portion of the lens 102. In the example shown in FIG. 1B, the second lens portion 110 can have a ring shape and surround the first lens portion 108 with a circular cross-section. Although FIG. 1B shows only one second lens portion 110 for each lens 102, multiple second lens portions 110 can be provided, similar to structure shown in FIG. 1A.

Figure 1C:
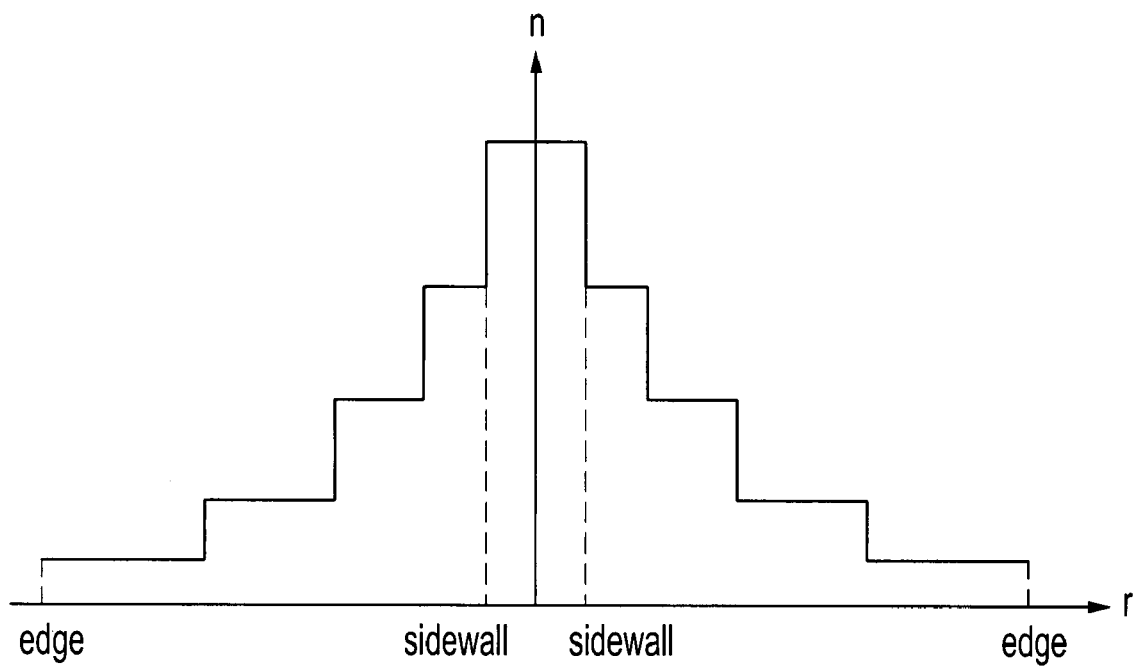
FIGS. 1C and 1D illustrate examples of refraction index profiles of the lenses respectively shown in FIGS. 1A and 1B in a radial direction.
Figure 1D:
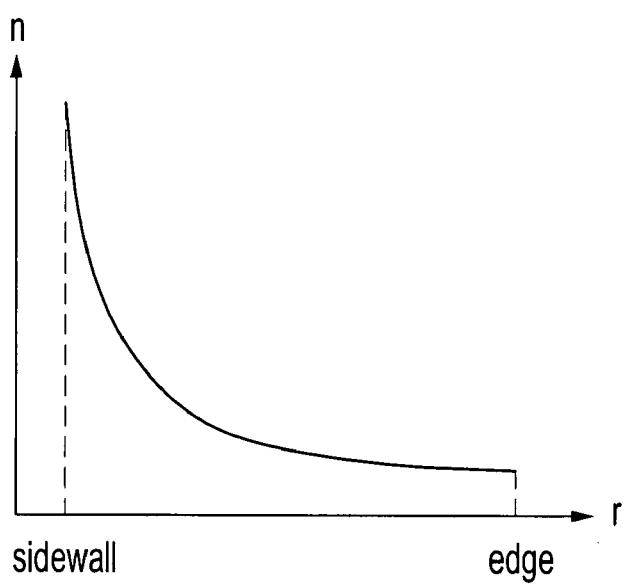

The first and second lens portions 108, 110 of each lens 102 can be formed to have different refraction indices $n_1$ and $n_2$. In one example, the refraction index $n_2$ of the various second lens portions 110 can vary. For example, the second lens portions 110 can be formed of lens materials having respective different refraction indices. Additionally or alternatively, the second lens portions 110 can have one or more refraction indices $n_2$ different from the refraction index $n_1$ of the first lens portion 108. As FIGS. 1C and 1D show, the refraction indices of the first and second lens portions 108, 110 can decrease gradually in the radial direction r-r from the first lens portion 108 toward the edge 114 of the lens 102. Such a refraction index gradient formation can result in a positive focus lens 102. In one example, the first and second lens portions 108, 110 have respective refraction indices of about 2.0, 1.85, 1.75, 1.55, and 1.45 in the radial direction r-r. Similarly, a negative focus lens 102 can be obtained by gradually increasing the refraction indices of the first and second lens portion 108, 110 in the same radial direction r-r described above.

The refraction index change can be carried out at either a constant rate or a varying rate from one of the first and second portions 108, 110 to another. As FIG. 1C shows, the refraction indices of the first and second lens portions 108, 110 can decrease at a reduced rate in the radial direction r-r from the first lens portion 108 toward the edge 114 of the lens 102. In such a case, larger changes in refraction index occur near the first lens portion 108 while smaller changes occur toward the edge 114 of the lens 102. Additionally or alternatively, the various second lens portions 110 can be formed to have an increasing thickness in the radial direction r-r from the first lens portion 108 toward the edge 114 of the lens 102, as is shown in FIG. 1D. As one skilled in the art will appreciate, the refraction index profile of the first and second lens portions 108, 110 can be determined depending on the application of the lens 102 or lens array 100.

The first and second lens portions 108 and 110 can be formed of any lens material. For example, the first and second lens portions 108 and 110 can be any transparent material, such as glass, that allows incident light to pass through. Example lens materials include, but are not limited to, glass, such as zinc selenide (ZnSe), boro-phospho-silicate glass (BPSG), phosphosilicate glass (PSG), borosilicate glass (BSG), silicon oxide, silicon nitride, or silicon oxynitride; an optical thermoplastic material, such as tantalum pentoxide ($Ta_2O_5$), titanium oxide ($TiO_2$), polymethylmethacrylate, polycarbonate, polyolefin, cellulose acetate butyrate, or polystyrene; a polyimide; a thermoset resin such as an epoxy resin; a photosensitive gelatin; a radiation curable resin such as acrylate, methacrylate, urethane acrylate, epoxy acrylate, or polyester acrylate; and other lens materials.

In one embodiment, the first and second lens portions 108, 110 can be made of any inorganic lens material. For example, the first lens portion 108 can be formed of a nitride material, such as $Si_3N_4$. One or more of the second lens portions 110 can be formed of an oxynitride material (e.g., $SiO_xN_y$) having varying oxide to nitride ratios. In one example, the nitrogen content in the oxynitride material of the radially outermost second lens portion 110r (see, e.g., FIG. 1A) is reduced to zero while the oxygen content is increased to about 100% so that such second lens portion 110r is formed of an oxide material, such as $SiO_2$. Those skilled in the art will appreciate that the first and second portions 108, 110 of each lens 102 can be formed of various other lens materials including those discussed above.

Figure 2A:
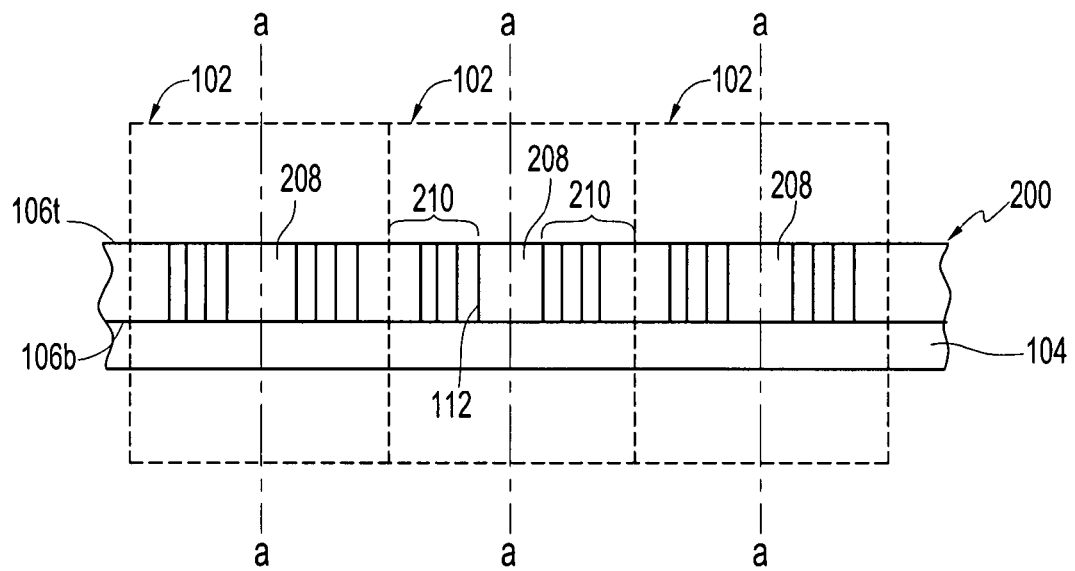
FIGS. 2A and 2B are respectively partial cross-sectional and top-down views of lens arrays containing lenses formed according to additional embodiments disclosed herein.
Figure 2B:
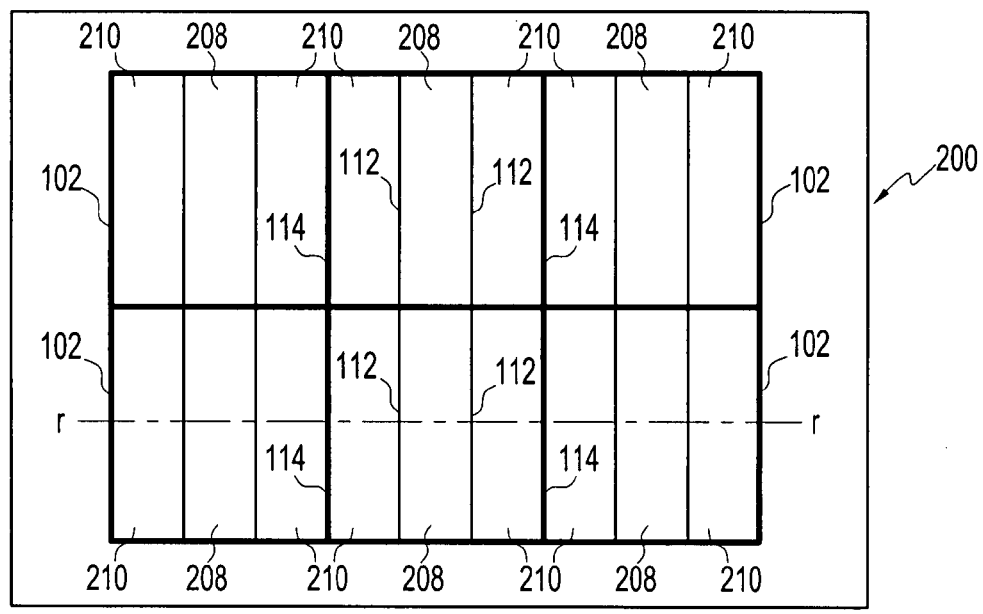

FIGS. 2A and 2B each show an additional embodiment of a lens array 200 similar to the lens arrays 100 shown in FIGS. 1A and 1B. Each lens 102 in the lens array 200 can be formed to comprise first and second lens portions 208, 210, which are similar to the lens portions 108, 110 described above except for the variations described below. In this embodiment, each of the second lens portions 210 in a lens 102 are formed to extend to the base surface 106b of the lens 102 as is shown in FIG. 2A. For example, the second lens portions 210 are each formed on the supporting structure 104. The base and top surfaces 106b, 106t are each defined by both the first and second lens portions 208, 210.

FIG. 2B shows that the first lens portion 208 of each lens 102 can have a substantially rectangular shape. The first lens portion 208 in each lens 102 can be formed to extend across the lens 102. In the alternative, the longitudinal first lens portion 208 can be formed to extend across the lens array 200. As FIG. 2B shows, each first lens portion 208 can be formed near a center portion in the radial direction r-r of the lens 102 with the second lens portions 210 positioned on one or both sides of the first lens portion 208. In this embodiment, the second lens portions 210 can be similarly formed in a substantially rectangular shape. Although FIG. 2B shows only one second lens portion 210 formed adjacent to each sidewall 112 of a first lens portion 208, multiple second lens portions 210 can be provided, as is similar to the structures shown in FIG. 2A.

Figure 2C:
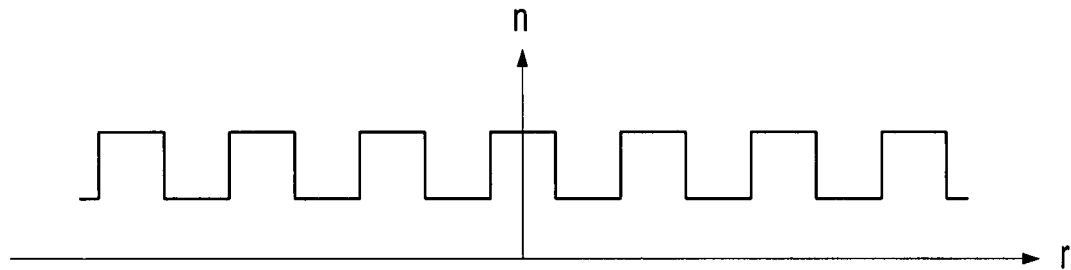
FIG. 2C illustrates an example of the refraction index profile of a FIG. 2B lens array in its radial direction.

FIG. 2C shows one example of the refraction index profile of the lens array 200 shown in FIG. 2B. In this example, the refraction indices of the first and second lens portions 208, 210 increase and decrease alternately along the radial direction r-r and across the lens array 200.

Figure 3:
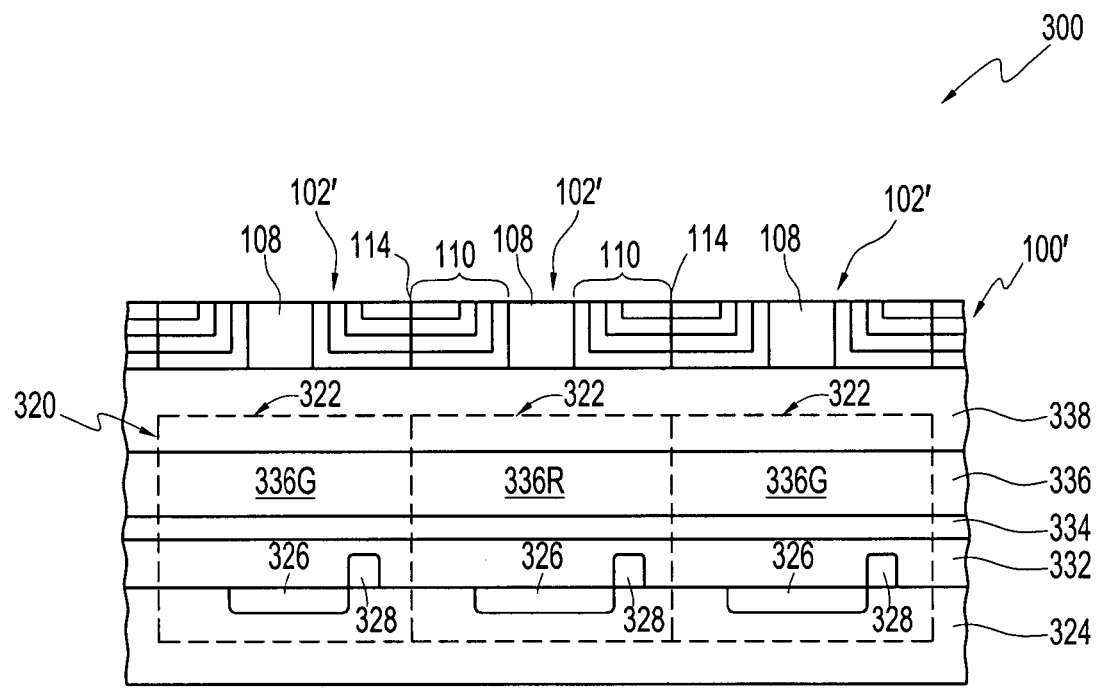
FIG. 3 illustrates a partial cross-sectional view of an imaging device containing the lens array shown in FIG. 1A.

FIG. 3 illustrates a partial cross-sectional view of a portion of a semiconductor-based imaging device 300, such as a CMOS imaging device, constructed in accordance with one embodiment. In the imaging device 300, a microlens array 100', similar to the lens array 100 shown in FIGS. 1A and 1B, can be employed and formed over an image pixel array 320 containing a plurality of image pixel cells 322. The microlens array 100' can also be formed to be similar to the lens array 200 shown in FIGS. 2A and 2B. Although the image pixel array 320 in FIG. 3 is shown to contain three pixel cells 322, an imaging device 300 could be formed to contain millions of pixel cells 322 depending upon the size and resolution of the imaging device 300. As the plural pixel cells 322 can be formed to have a similar structure, the following description is provided in connection with only one pixel cell 322.

In each pixel cell 322, a semiconductor device substrate 324 can be provided, over which various semiconductor components are formed. The device substrate 324 can have a single layer structure, such as an active silicon layer, or a combination of several layers with different implantation conductivities and concentrations. As those skilled in the art will appreciate, the device substrate 324 can be in various forms and be formed by various methods.

A photosensor 326 can be formed in each pixel cell 322 in association with the device substrate 324. Any of various photosensors 326, such as a photogate, phototransistor, photoconductor, or photodiode, can be employed. For a color imaging device, each photosensor 326 can be formed to receive one of red, green, and blue light passing through an appropriate color filter. For a monochromatic imaging device, all photosensors 326 of the pixel array 320 can receive the same incident wavelengths, through no filter or the same type of filters. For example, all photosensors 326 are formed to detect infrared light. Those skilled in the art will appreciate that the photosensor 326 can be in various other forms.

The imaging device 300 can comprise various other semiconductor structures and components that may be conventionally employed and formed in association with the substrate 324. For example, one or more transistors 328, such as those used in a 4-T CMOS imager pixel or other CMOS pixel architectures, can be provided in each pixel cell 322. A plurality of interlayer dielectric layers and associated metallization structures, collectively shown as 332, can be provided over the image pixel array 320. A passivation layer 334 may be formed over the interlayer dielectric layers 332, and may typically be planarized, such as by chemical mechanical polishing (CMP), to create a substantially planar surface. The passivation layer 334 can be formed, for example, of one or more of phospho-silicate-glass (PSG), silicon nitride, nitride, oxide, and oxynitride. Those skilled in the art will appreciate that the transistors 328, interlayer dielectric layers 332, and passivation layer 334 can be in various other forms and be formed by various methods.

Optionally, a color filter array 336 can be provided over the passivation layer 334. The color filter array 336 can comprise multiple color filters, such as red, green, and blue filters, two of which 336R, 336G are shown in FIG. 3. Each color filter 336R, 336G can be positioned to correspond to a respective photosensor 326. For example, the color filter array 336 can include first and second color filters 336R, 336G and additional color filters in pixels in adjacent rows. For a color imaging device, the first and second color filters 336R, 336G and additional color filters in adjacent rows, are each adapted to pass a selected radiation component in the incident light. The illustrated color filters 336R, 336G are red and green filters for passing respectively red and green light. The red and green filters 336R, 336G, as well as additional green and blue filters in adjacent rows, can be arranged in any of various patterns, such as e.g., a Bayer pattern. For a monochromatic imaging device, the color filters 336R, 336G and additional filters can be similarly formed to pass the same color of light, or otherwise be left out of the imaging device 300. A dielectric layer 338, similar to the supporting structure 104 described above, can be provided over the color filter array 336 for protection.

The microlens array 100' is formed over the image pixel array 320. When a color filter array 336 is employed in the imaging device 300, the microlens array 100' can be formed over the color filter array 336 or the dielectric layer 338. Otherwise, the microlens array 100' can be formed over the passivation layer 334.

The various microlenses 102' in the microlens array 100' are similarly formed as lenses 102 described above, and arranged in rows and columns. Each microlens 102' can be positioned to correspond to a pixel cell 322 and its associated photosensor 326. The microlenses 102' can be formed to contain a gap between adjacent microlenses 102'. Alternatively, each microlens 102' can be formed to cover substantially the entire pixel cell 322, so that adjacent microlenses 102' abut each other. For example, the edge 114 of one microlens 102' can partially abut an edge 114 of an adjacent microlens 102', as is shown in FIG. 3. By forming microlenses 102' close to one another, e.g., abutting adjacent microlenses 102', the resultant microlens array 100' is substantially gapless or otherwise has little or no empty space between adjacent microlenses 102'.

Fabrication of a lens array 100 (FIG. 1A) will next be described in connection with FIGS. 4A to 4C, which are partial cross-sectional views illustrating an embodiment of fabricating the lens array 100 formed by plural lenses 102.

Figure 4A:
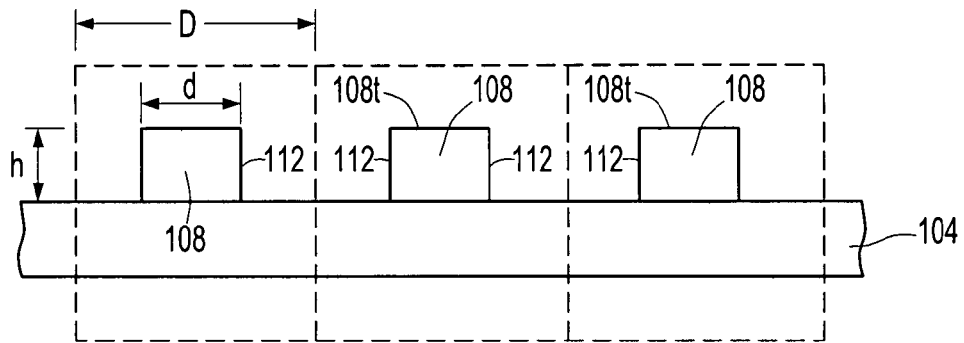
FIGS. 4A to 4C illustrate method steps for forming a FIG. 1A lens array.

FIG. 4A shows that a plurality of first lens portions 108 are formed on a supporting structure 104 by any of various methods. For example, a lens material can be deposited over the supporting structure 104 and subjected to a photolithographic exposure process to form a plurality first lens portions 108. The lens material can be any of the lens materials described above, for example, a lens material having a nitrogen content. As FIG. 4A shows, each first lens portion 108 has a top portion 108t elevated from the supporting structure 104 by a height h. The first lens portion 108 also has a sidewall 112 extending substantially transversely from the supporting structure 104. The radial dimension d of each first lens portion 108 can be about ¼ to about ½ of the radial dimension D of the to be formed lens 102. As previously described, the various first lens portions 108 can be arranged in rows and columns (see FIG. 1B).

Figure 4B:
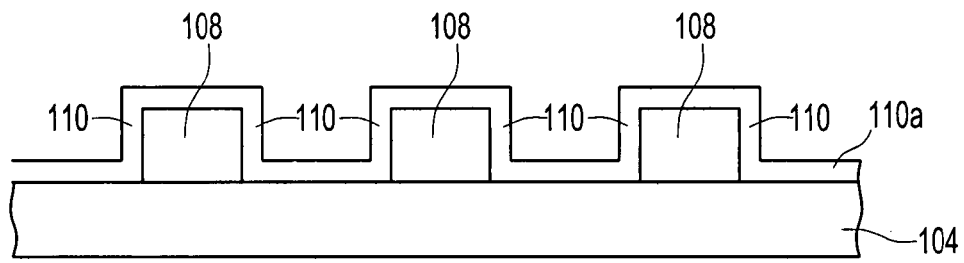

FIG. 4B shows another lens material 110a being formed over the supporting structure 104 and the first lens portions 108 by any suitable conformal technique. For example, the lens material 110a can be formed by one or more spin-on techniques or any other technique for conformal material deposition, such as chemical vapor deposition (CVD), physical vapor deposition (PVD), and plasma enhanced chemical vapor deposition (PECVD). The lens material 110a can cover the various first lens portions 108, the supporting structure 104 between the adjacent first lens portions 108, as well as the sidewall 112 of each first lens portion 108 forming one or more second lens portions 110 adjacent to each first lens portion 108. In one example, an oxynitride material is deposited over the supporting structure 104 and the first lens portions 108 in the form a continuous layer of lens material 110a.

Figure 4C:
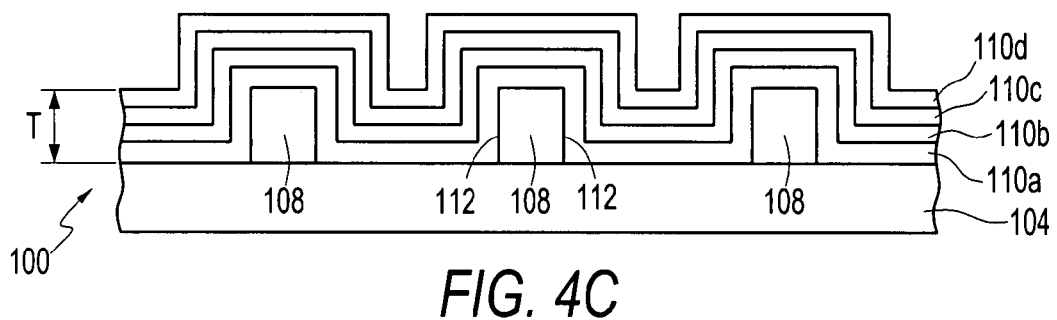

FIG. 4C shows additional lens materials 110b, 110c, 110d being formed over the supporting structure 104 and/or the lens material 110a, such as by repeating the process described above in connection with FIG. 4B. As FIG. 4C shows, the lens materials 110a, 110b, 110c, 110d so formed can be stacked, such as on the sidewall 112 of the first lens portion 108 and in a radial direction r-r (see, FIG. 1B). In one example, the lens materials 110a, 110b, 110c, 110d can also be stacked in an axial direction a-a (see, FIG. 1A) and over the top portion 108t of the first lens portion 108 and over the supporting structure 104 portions between adjacent first lens portions 108. In one example, the lens materials 110a, 110b, 110c, 110d are continuous throughout the lens array 100 (see, FIG. 1A), or across the die or wafer (not shown).

The stacked lens materials 110a, 110b, 110c, 110d can have an accumulated thickness T, as is shown in FIG. 4C. Although FIG. 4C shows four lens materials 110a, 110b, 110c, 110d, more or fewer lens materials can be deposited over the supporting structure 104 and the first lens portions 108 to form the second lens portions 110. In one example, the FIG. 4B process is repeated to form additional lens materials until the accumulated thickness T of all stacked lens materials 110a, 110b, 110c, 110d and any other additional lens materials exceeds the height h of the first lens portions 108.

The various lens materials 110a, 110b, 110 c, 110d can be formed to have different refraction indices. In one example, an oxynitride material (e.g., $SiO_xN_y$) can be used to form the various lens materials 110a, 110b, 110c, 110d over the supporting structure 104. Because the nitrogen and/or oxygen content in the oxynitride material can determine the refraction index of the oxynitride material, the nitrogen and/or oxygen content in the oxynitride material is adjusted to form the various lens materials 110a, 110b, 110c, 110d having different refraction indices. The resultant lens 102 can thus have varying refraction indices in a radial direction r-r from the first lens portion 108 toward the edge 114 of the lens 102. For example, the nitrogen content in the oxynitride material can be gradually decreased and/or the oxygen content can be gradually increased to reduce the refraction indices of the lens materials 110a, 110b, 110c, 110d in the radial direction described above, resulting in a positive focus lens 102. The change of refraction indices can be carried out at a reduced rate so that the resultant lens 102 can have a refraction index profile as is shown in FIG. 1C.

In one embodiment, a chemical vapor deposition (CVD) process is used to deposit an oxynitride material over the supporting structure 104 and/or the first lens portions 108, as is similarly shown in FIG. 4B. During the chemical vapor deposition process, the nitrogen and/or oxygen content in the oxynitride material is continuously varied, to reduce the nitrogen content from about 100% to 0% while increase the oxygen content from about 0% to 100%. The resultant lens 102 can thus have the highest nitrogen content (and highest refraction index) near the first lens portion 108. The refraction index of the lens 102 is gradually reduced in the radial direction r-r to the lowest refraction index at the edge 114 of the lens 102. Details concerning the formation of additional lens materials 110a, 110b, 110c, 110d by a chemical vapor deposition (CVD) are described in co-pending U.S. patent application Ser. No. 11/501,055 entitled "Method and Apparatus Providing Graded-Index Microlenses" filed Aug. 9, 2006 by the same applicants and owned by the assignee. The entirety of the above-identified co-pending patent application is incorporated herein by reference.

The structure shown in FIG. 4C can be subjected to a selective removal process to remove the portions of lens materials 110a, 110b, 110c, 110d located on the various first lens portions 108 and form a lens array 100 as illustrated in FIG. 1A. In one example, the selective removal process can be further carried out to remove any irregular topology existing in the top surface 108t (see FIG. 4A) of the first lens portions 108 to sufficiently expose the first lens portions 108 and provide a planar top surface 106t in the result lens array 100. In another example, a planarization process can be employed during such a selective removal process to ensure that the resulting top surface 106t of the lens array 100 is a planarized surface.

If desired, a portion of the lens material formed on the supporting structure 104 can be selectively removed before any additional lens material is to be formed. For example, after forming the lens material 110a as is shown in FIG. 4B and before forming any lens material 110b, 110c, 110d, a portion of the lens material 110a formed on the supporting structure 104 is removed to expose the underlying supporting structure 104 so that the next lens material 110b can be formed on the supporting structure 104. Various methods, such as a spacer material removal process, can be employed for such a purpose. In one example, each deposited lens material, e.g., 110a, 110b, 110c, 110d, can be removed from all but portions at sidewalls 112 of the first lens portions 108 such that each second lens portion 110 in the resultant lens 102 can extend from the top surface 106t to the base surface 106b of the lens 102, as is shown in FIG. 2A.

Figure 5:
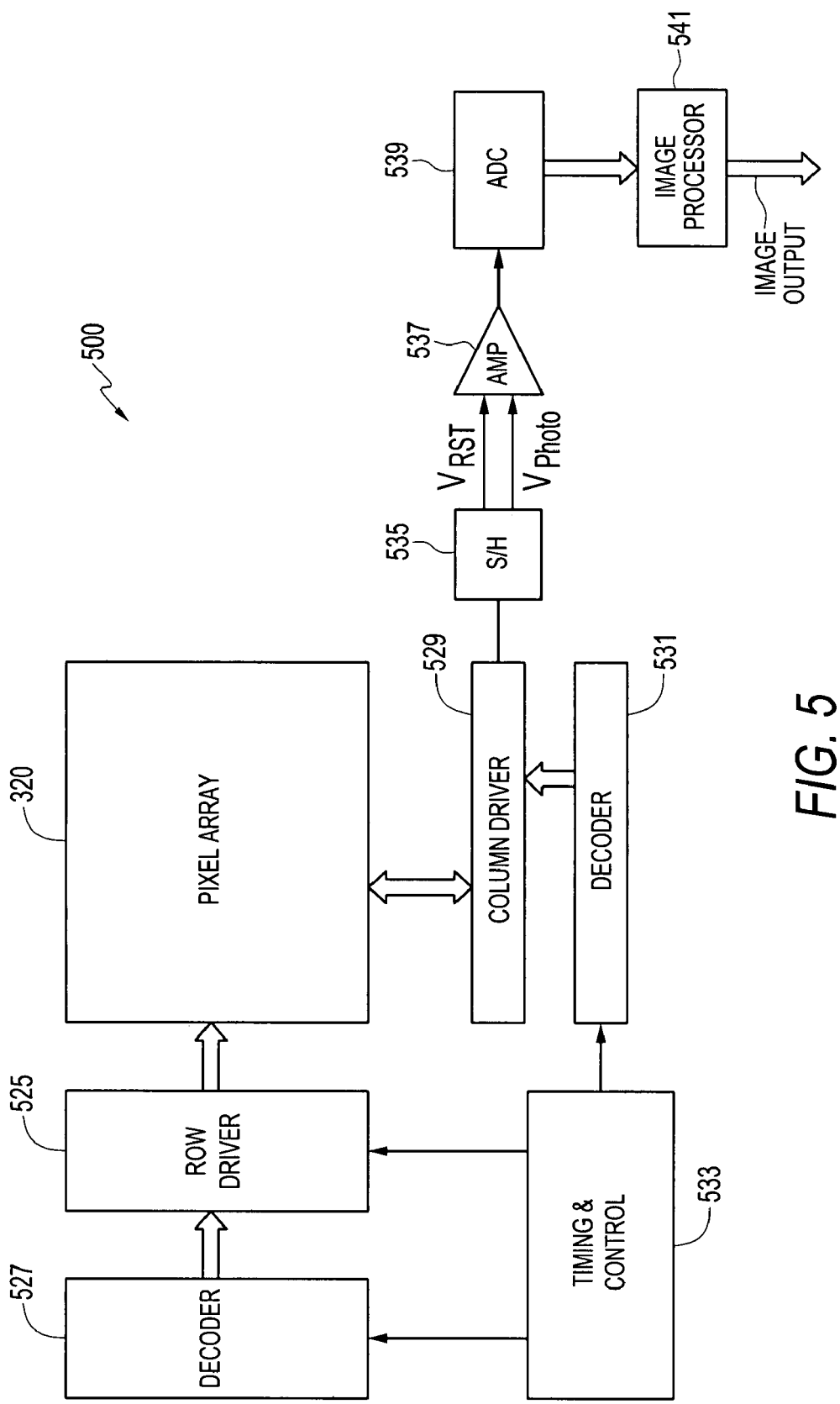
FIG. 5 is a block diagram of an imaging device including a pixel array associated with a lens array constructed in accordance with one of the embodiments disclosed herein.

FIG. 5 is a block diagram showing the major electrical components of a CMOS imaging device 500, which contains a pixel array 320 having a microlens array 100' constructed as described above. The pixel array 320 is formed with pixel cells arranged in a predetermined number of columns and rows. The pixel array 320 can capture incident radiation from an optical image and convert the captured radiation to electrical signals, such as analog signals.

The electrical signals obtained and generated by the pixel cells in the pixel array 320 can be read out row by row to provide image data of the captured optical image. For example, pixel cells in a row of the pixel array 320 are all selected for read-out at the same time by a row select line, and each pixel cell in a selected column of the row provides a signal representative of received light to a column output line. That is, each column also has a select line, and the pixel cells of each column are selectively read out onto output lines in response to the column select lines. The row select lines in the pixel array 320 are selectively activated by a row driver 525 in response to a row address decoder 527. The column select lines are selectively activated by a column driver 529 in response to a column address decoder 531.

The imaging device 500 can also comprise a timing and controlling circuit 533, which generates one or more read-out control signals to control the operation of the various components in the imaging device 500. For example, the timing and controlling circuit 533 can control the address decoders 527 and 531 in any of various conventional ways to select the appropriate row and column lines for pixel signal read-out.

The electrical signals output from the pixels on the column output lines typically include a pixel reset signal ($V_{RST}$) and a pixel image signal ($V_{Photo}$) for each image pixel cell in a CMOS imaging device. In an example of an image pixel array 320 containing four-transistor (4-T) CMOS image pixel cell, the pixel reset signal ($V_{RST}$) can be obtained from a floating diffusion region when it is reset by a reset signal RST applied to a corresponding reset transistor, while the pixel image signal ($V_{Photo}$) is obtained from the floating diffusion region when photo generated charge is transferred to the floating diffusion region. Both the $V_{RST}$ and $V_{Photo}$ signals can be read into a sample and hold circuit (S/H) 535. In one example, a differential signal ($V_{RST}-V_{Photo}$) can be produced by a differential amplifier (AMP) 537 for each pixel cell. Each pixel cell's differential signal can optionally be amplified and is then digitized by an analog-to-digital converter (ADC) 539, which supplies digitized pixel data as the image data to an image processor 541, which processes the pixel signals from the pixel array 320 to produce an image. Those skilled in the art would appreciate that the imaging device 500 and its various components can be in various other forms and/or operate in various other ways. In addition, although the imaging device 500 illustrated is a CMOS imaging device, other types of solid state imaging devices, pixel arrays, and readout circuitries may also be used, including, for example, CCD devices.

Figure 6:
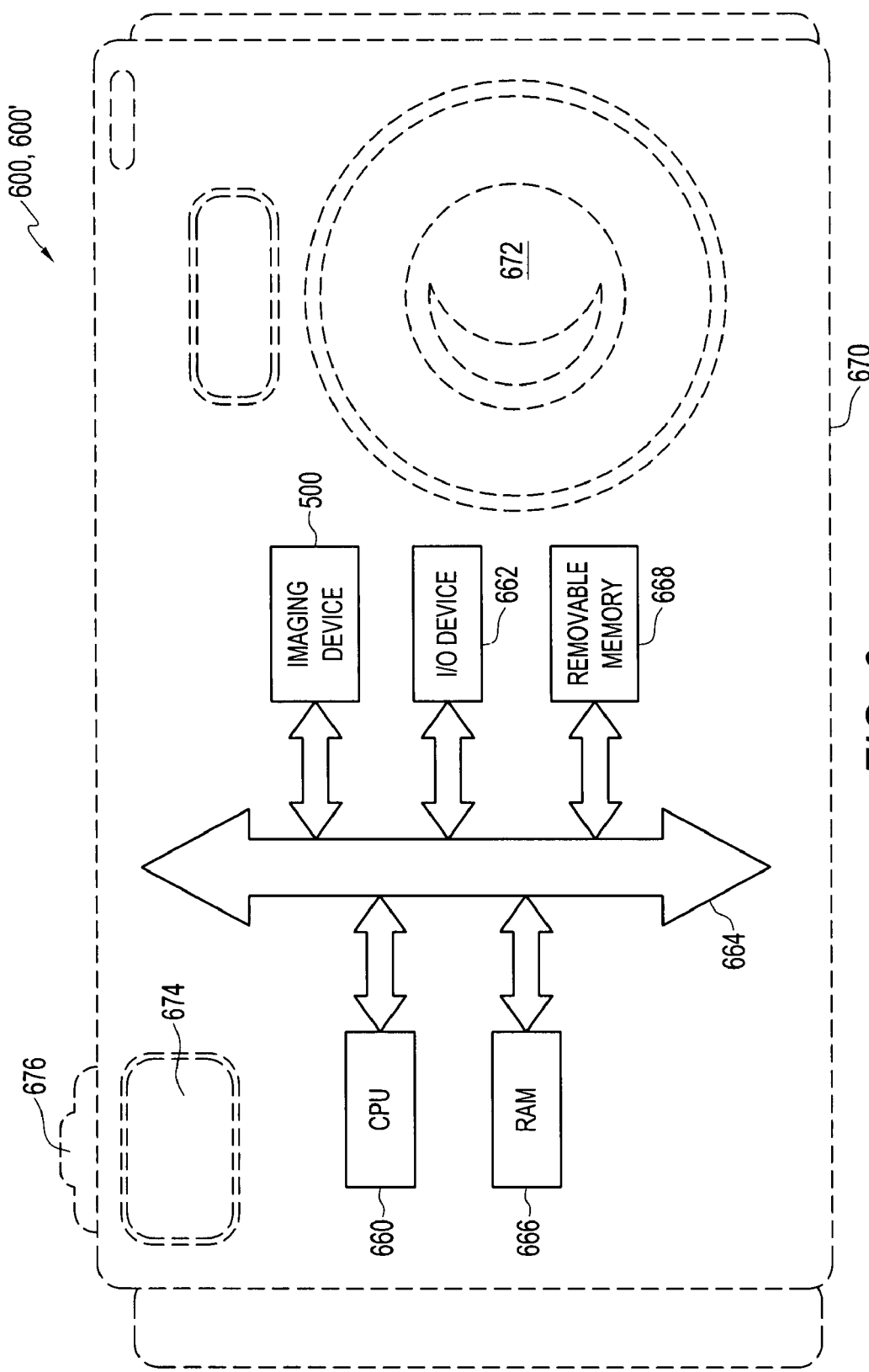
FIG. 6 is an illustration of an imaging system comprising the imaging device formed in accordance with one of the embodiments disclosed herein.

FIG. 6 illustrates a processing system 600 including an imaging device 500. The imaging device 500 may be combined with a processor, such as a CPU, digital signal processor, or microprocessor, with or without memory storage on a single integrated circuit or on a different chip than the processor. In the example shown in FIG. 6, the processing system 600 can generally comprise a central processing unit (CPU) 660, such as a microprocessor, that communicates with one or more input/output (I/O) devices 662 over a bus 664. The processing system 600 can also comprise random access memory (RAM) 666, and/or removable memory 668, such as flash memory, which can communicate with CPU 660 over the bus 664.

The processing system 600 can be any of various systems having digital circuits that could include the imaging device 500. Without being limiting, such a processing system 600 could include a computer system, a digital still or video camera illustrated by the dotted lines of FIG. 6, a scanner, a machine vision, a vehicle navigation, a video telephone system, a camera mobile telephone, a surveillance system, an auto focus system, a star tracker system, a motion detection system, an image stabilization system, and other systems supporting image acquisition. In the example shown in FIG. 6, the processing system 600 is employed in a digital still or video camera 600', which has a camera body portion 670, a camera lens 672 for focusing an image on the pixel array 320 (see FIG. 5), a view finder 674, and a shutter release button 676. When depressed, the shutter release button 676 operates the imaging device 500 so that light from an image passes through the camera lens 672. The incident light then impinges on and is captured by the pixel array 320. As those skilled in the art will appreciate, the imaging device 500, the processing system 600, the camera system 600' and other various components contained therein can also be formed and/or operate in various other ways.

It is again noted that although the above embodiments are described with reference to a CMOS imaging device, they are not limited to CMOS imaging devices and can be used with other solid state imaging device technology (e.g., CCD technology) as well. In addition, while embodiments have been described in which the described and illustrated lens structure, e.g., microlens array 100', is used in an imaging device 300 for capturing an image, the lens structures may also be used in display devices in which each pixel includes a light emitting element emitting light which passes through the lens structure for image display.

While the foregoing description and drawings represent examples of embodiments, it will be understood that various additions, modifications, and substitutions may be made therein as defined in the accompanying claims. In particular, it will be clear to those skilled in the art that other specific forms, structures, arrangements, proportions, materials can be used without departing from the essential characteristics thereof or from the spirit or scope of the invention. The presently disclosed embodiments are therefore to be considered in all respects as illustrative and not restrictive.

What is claimed as new and desired to be protected by Letters Patent of the United States is:

1. A lens defined by a base surface and a top surface and having an axial direction transverse to the base surface, the lens comprising:
   a first lens portion having a sidewall extending substantially in the axial direction of the lens; and a plurality of second lens portions sequentially arranged in a radial direction of the lens and at least partially surrounding the sidewall of the first lens portion, the second lens portions being formed of lens materials having different refraction indices, wherein the first lens portion is formed of a nitride material.

2. The lens of claim 1, wherein the sidewall of the first lens portion extends from the base surface to the top surface of the lens.

3. The lens of claim 1, wherein at least one of the second lens portions defines a portion of each of the base and top surfaces of the lens.

4. The lens of claim 1, wherein each second lens portion substantially surrounds the sidewall of the first lens portion.

5. The lens of claim 1, wherein the second lens portions are formed of a lens material having an oxygen content.

6. The lens of claim 1, wherein refraction indices of the first and second lens portions gradually decrease in the radial direction from the first lens portion toward an edge of the lens.

7. The lens of claim 1, wherein refraction indices of the first and second lens portions decrease by a reduced rate in the radial direction from the first lens portion toward an edge of the lens.

8. A lens array comprising:
a plurality of first lens portions each having a sidewall extending substantially transverse to a base surface of the lens array; and
at least one second lens portion surrounding the sidewall of each first lens portion;
wherein the first and second portions comprise different lens materials and each form at least a portion of each of the base surface and a top surface of the lens array,
wherein the plurality of first lens portions are formed of a lens material having a higher refraction index than that of the at least one second lens portion.

9. The lens array of claim 8, wherein the lens array is a microlens array.

10. An imaging system comprising:
a pixel array comprising a plurality of pixel cells; and
a lens array over the pixel array and comprising a plurality of lenses, the lens array comprising:
a plurality of first lens portions each corresponding to a pixel cell, and
a plurality of second lens portions substantially surrounding each first lens portion to form a lens, the second lens portions being formed of lens materials having different refraction indices,
wherein at least one of the plurality of first lens portions is formed of a nitride material.

11. The imaging system of claim 10, wherein the lens array has a planarized surface.

12. The imaging system of claim 10, wherein the imaging system is part of a camera.

13. A method of forming a lens array, the method comprising:

forming a plurality of first lens portions on a supporting structure; and
forming at least one second lens portion on the supporting structure to surround at least a portion of each first lens portion, the first lens portion and the second lens portion forming a lens;
wherein the first and second lens portions are formed of lens materials having different refraction indices.

14. The method of claim 13, wherein the step of forming at least one second lens portion comprises depositing a second lens material over the first lens portions and supporting structure.

15. The method of claim 14, wherein the step of forming a second lens portion further comprises depositing the second lens material over the first lens material, the first and second lens materials having different refraction indices.

16. The method of claim 13, wherein the step of forming at least one second lens portion comprises depositing a first oxynitride material having a first oxide to nitride ratio.

17. The method of claim 16, wherein the step of forming at least one second lens portion further comprises depositing a second oxynitride material having a second and different oxide to nitride ratio.

18. The method of claim 13, wherein the step of forming at least one second lens portion comprises depositing an oxynitride material over the first lens portions and supporting structure by a chemical vapor deposition process.

19. The method of claim 18, wherein the step of forming at least one second lens portion further comprises varying an oxide to nitride ratio of the oxynitride material.

20. The method of claim 19, wherein the step of forming at least one second lens portion comprises varying the oxide to nitride ratio of the lens material to increase an oxygen content to about 100% and reduce a nitrogen content to about 0%.

21. A method of forming an imaging device, the method comprising:
providing a semiconductor structure comprising a pixel array;
forming a plurality of first lens portions on the semiconductor structure, each first lens portion corresponding to a pixel cell of the array and spaced from a first lens portion in an adjacent pixel cell; and
depositing a continuous lens material over the semiconductor structure and the first lens portions to form a plurality of second lens portions each corresponding to a pixel cell of the array;
wherein the first and second lens portions are formed of lens materials having different refraction indices.

22. The method of claim 21 further comprising selectively removing a portion of the lens material to expose the underlying first lens portions.

23. The method of claim 21, wherein the step of depositing a lens material comprises depositing an oxynitride material and varying its oxide to nitride ratio of the oxynitride material.

* * * * *